(12) United States Patent
McCarren et al.

(10) Patent No.: US 10,239,157 B2
(45) Date of Patent: Mar. 26, 2019

(54) ADDITIVE MACHINE UTILIZING ROTATIONAL BUILD SURFACE

(71) Applicant: General Electric Company, Schenectady, NY (US)

(72) Inventors: John Michael McCarren, South Lebanon, OH (US); Herbert Chidsey Roberts, Middletown, OH (US); Eric Alan Estill, Morrow, OH (US); Peter Andrew Flynn, Delmar, NY (US)

(73) Assignee: General Electric Company, Schenectady, NY (US)

(*) Notice: Subject to any disclaimer, the term of this patent is extended or adjusted under 35 U.S.C. 154(b) by 296 days.

(21) Appl. No.: 15/091,739

(22) Filed: Apr. 6, 2016

(65) Prior Publication Data

US 2017/0291260 A1    Oct. 12, 2017

(51) Int. Cl.
*B23K 26/342* (2014.01)
*B23K 26/06* (2014.01)
*B23K 26/08* (2014.01)
*B22F 3/105* (2006.01)
*B22F 5/00* (2006.01)
(Continued)

(52) U.S. Cl.
CPC .......... *B23K 26/342* (2015.10); *B22F 3/1055* (2013.01); *B22F 5/009* (2013.01); *B22F 5/04* (2013.01); *B23K 26/0604* (2013.01); *B23K 26/0823* (2013.01); *B29C 64/153* (2017.08); *B29C 64/205* (2017.08); *B29C 64/241* (2017.08); *B29C 64/282* (2017.08); *B22F 2003/1056* (2013.01);
(Continued)

(58) Field of Classification Search
CPC .............. B23K 26/342; B23K 26/0823; B23K 26/0604; B23K 26/2201; B23K 26/001
USPC .............. 219/121.6, 121.63, 121.65, 121.84; 419/30, 47, 53, 55
See application file for complete search history.

(56) References Cited

U.S. PATENT DOCUMENTS 3,792,683 A * 2/1974 Bragg .................... B05C 19/025
                                                    118/416
3,989,859 A * 11/1976 Koerper .............. B05B 13/0228
                                                    427/553
(Continued)

FOREIGN PATENT DOCUMENTS

EP    1043480    11/2000
EP    1308236     7/2003
(Continued)

OTHER PUBLICATIONS

"Standard Terminology for Additive Manufacturing—General Principles—Terminology 1,2," ISO/ASTM 52900, pp. 947-955 (2015).
(Continued)

*Primary Examiner* — Thien S Tran
(74) *Attorney, Agent, or Firm* — General Electric Company; Brian Overbeck (57) ABSTRACT

An apparatus for manufacturing an axi-symmetric part. The apparatus includes a vessel configured to contain the powder. The vessel is also configured to receive a part such that at least a portion of the part contacts the powder contained within the vessel. A first energy source is configured to generate a first beam of energy. The first beam of energy is configured to melt the powder at a first predetermined location such that the melted powder fuses to the part.

20 Claims, 6 Drawing Sheets

(51) Int. Cl.
*B22F 5/04* (2006.01)
*B29C 64/153* (2017.01)
*B29C 64/241* (2017.01)
*B29C 64/282* (2017.01)
*B29C 64/205* (2017.01)
*B23K 101/00* (2006.01)
*B33Y 10/00* (2015.01)
*B33Y 30/00* (2015.01)

(52) U.S. Cl.
CPC ......... *B23K 2101/001* (2018.08); *B33Y 10/00* (2014.12); *B33Y 30/00* (2014.12); *Y02P 10/295* (2015.11)

(56) References Cited

U.S. PATENT DOCUMENTS

| | | | |
|---|---|---|---|
| 4,323,756 A | 4/1982 | Brown et al. | |
| 4,772,340 A * | 9/1988 | Kawaguchi | B23K 9/044 |
| | | | 148/512 |
| 6,368,060 B1 | 4/2002 | Fehrenbach et al. | |
| 6,660,209 B2 | 12/2003 | Leyden et al. | |
| 6,861,613 B1 * | 3/2005 | Meiners | B29C 64/153 |
| | | | 219/121.65 |
| 7,261,542 B2 | 8/2007 | Hickerson et al. | |
| 8,057,180 B1 | 11/2011 | Liang | |
| 8,172,562 B2 | 5/2012 | Mattes | |
| 8,245,519 B1 | 8/2012 | Liang | |
| 8,629,368 B2 | 1/2014 | Mazumder et al. | |
| 9,073,150 B2 | 7/2015 | Graichen | |
| 9,174,312 B2 | 11/2015 | Baughman et al. | |
| 2005/0011986 A1 * | 1/2005 | Foo | B65H 18/026 |
| | | | 242/532.6 |
| 2007/0205184 A1 | 9/2007 | Mazumder et al. | |
| 2011/0297081 A1 | 12/2011 | Green | |
| 2013/0015609 A1 | 1/2013 | Landau | |
| 2013/0045093 A1 | 2/2013 | Wunderlich et al. | |
| 2013/0056910 A1 * | 3/2013 | Houbertz-Krauss | B33Y 30/00 |
| | | | 264/401 |
| 2014/0130354 A1 | 5/2014 | Pal et al. | |
| 2014/0130514 A1 | 5/2014 | Pal | |
| 2014/0255198 A1 | 9/2014 | El-Wardany et al. | |
| 2015/0190962 A1 * | 7/2015 | Yang | B33Y 10/00 |
| | | | 428/209 |
| 2015/0259247 A1 | 9/2015 | Watanabe | |
| 2015/0306819 A1 * | 10/2015 | Ljungblad | B22F 3/1055 |
| | | | 419/55 |
| 2015/0314373 A1 | 11/2015 | Mironets et al. | |

FOREIGN PATENT DOCUMENTS

| | | |
|---|---|---|
| EP | 1419847 | 5/2004 |
| EP | 1769903 | 4/2006 |
| WO | 2012057908 | 5/2012 |
| WO | 2014052320 | 4/2014 |
| WO | 2015/091837 A1 | 6/2015 |

OTHER PUBLICATIONS

International Search Report and Written Opinion issued in connection with corresponding PCT Application No. PCT/US2017/026412 dated Jun. 22, 2017.

* cited by examiner

ADDITIVE MACHINE UTILIZING ROTATIONAL BUILD SURFACE

BACKGROUND OF THE INVENTION

The present invention relates to additive manufacturing of a 3-D object and more specifically to additive manufacturing of an object on a rotatable surface.

Complex mechanical parts used in the aircraft, power, and other industries are often configured to rotate or to surround a rotating object. Such parts generally have a radial symmetry but often have very complex structures radiating away from the axis. As a result, manufacture of such parts via conventional methods and known additive manufacturing methods can be difficult and require large capacity machines and workspaces. Also, buildup of larger single part and/or multipart axi-symmetric assemblies conventionally requires separate build steps. Therefore there is a need for an apparatus and method for building an axi-symmetric part without separate build steps.

BRIEF DESCRIPTION OF THE INVENTION

This need is addressed by an apparatus configured to rotate a part such that different surfaces of the part are exposed to a powder that can be fused by an energy source multiple times at each location.

According to one aspect of the present invention there is provided an apparatus for manufacturing an axi-symmetric part. The apparatus includes a vessel configured to contain the powder. The vessel is also configured to receive a workpiece such that at least a portion of the workpiece contacts the powder contained within the vessel. A first energy source is configured to generate a first beam of energy. The first beam of energy is configured to melt the powder at a first predetermined location such that the melted powder fuses to the workpiece.

According to another aspect of the present invention there is provided a method for manufacturing an axi-symmetric part using a powder-pond additive manufacturing system. The system includes a vessel that is configured to contain a powder and to rotatably support a workpiece. The system also a first energy source configured to generate a first energy beam sufficient to melt the powder at a predetermined location. The method includes the steps of: operating the first energy source; fusing the powder onto a surface of the workpiece when the workpiece is at a first radial position to form a first fused layer; rotating the workpiece to a second radial position; fusing the powder onto a surface of the workpiece when the workpiece is at the second radial position; rotating the workpiece to the first radial position; and fusing the powder onto the first fused layer to form a second fused layer.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
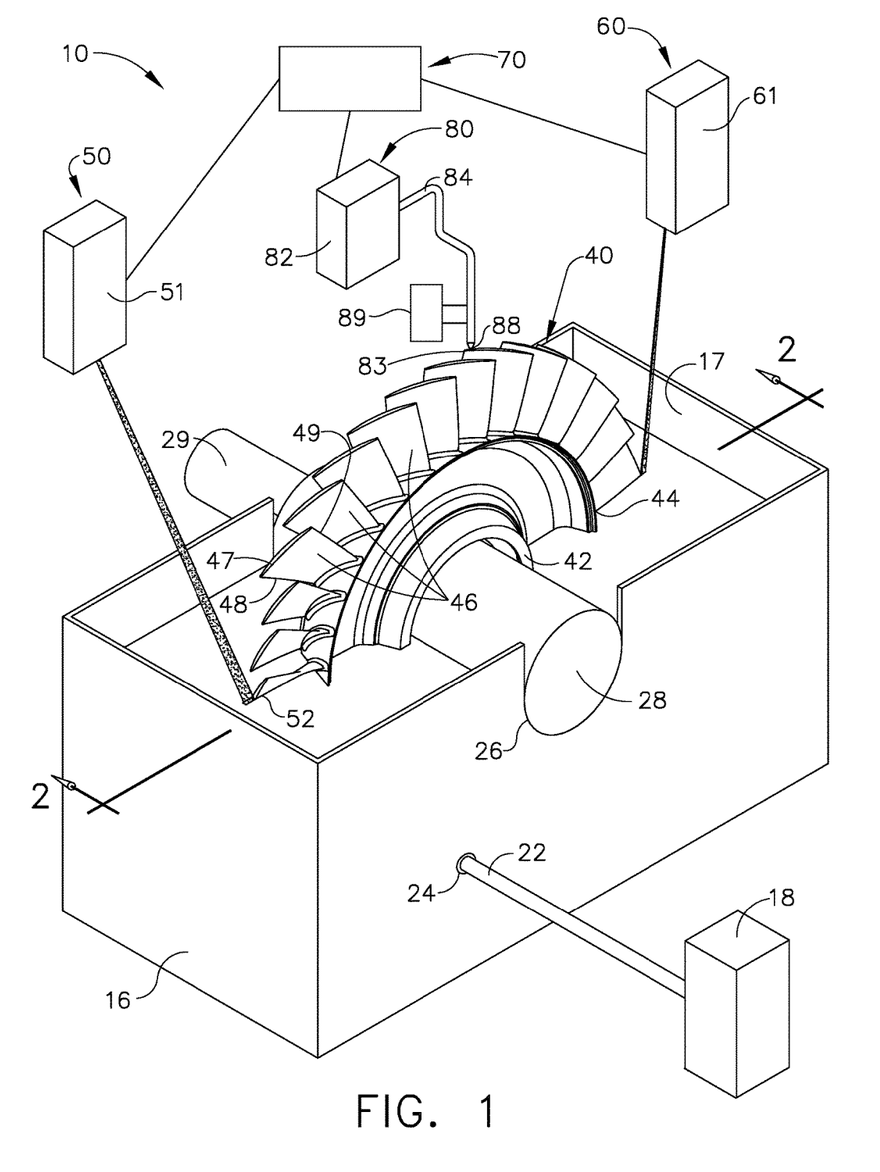
FIG. 1 shows a perspective view of an apparatus for additive manufacturing utilizing rotational build surfaces according embodiment of the present invention.

Referring to the drawings wherein identical reference numerals denote the same elements throughout the various views, FIG. 1 shows an apparatus 10 for radially building axially symmetric parts. As illustrated, apparatus 10 includes a powder-pond additive manufacturing system 50 and a powder-fed manufacturing system 80. The two systems are configured to be used separately, one after the other, or substantially simultaneously to build up an axially symmetric part as will be discussed further below. By way of example and not limitation, such axially symmetric parts that can be built using the apparatus 10 include the following: compressor fans, turbine fans, pump impellers, and the like.

Figure 2:
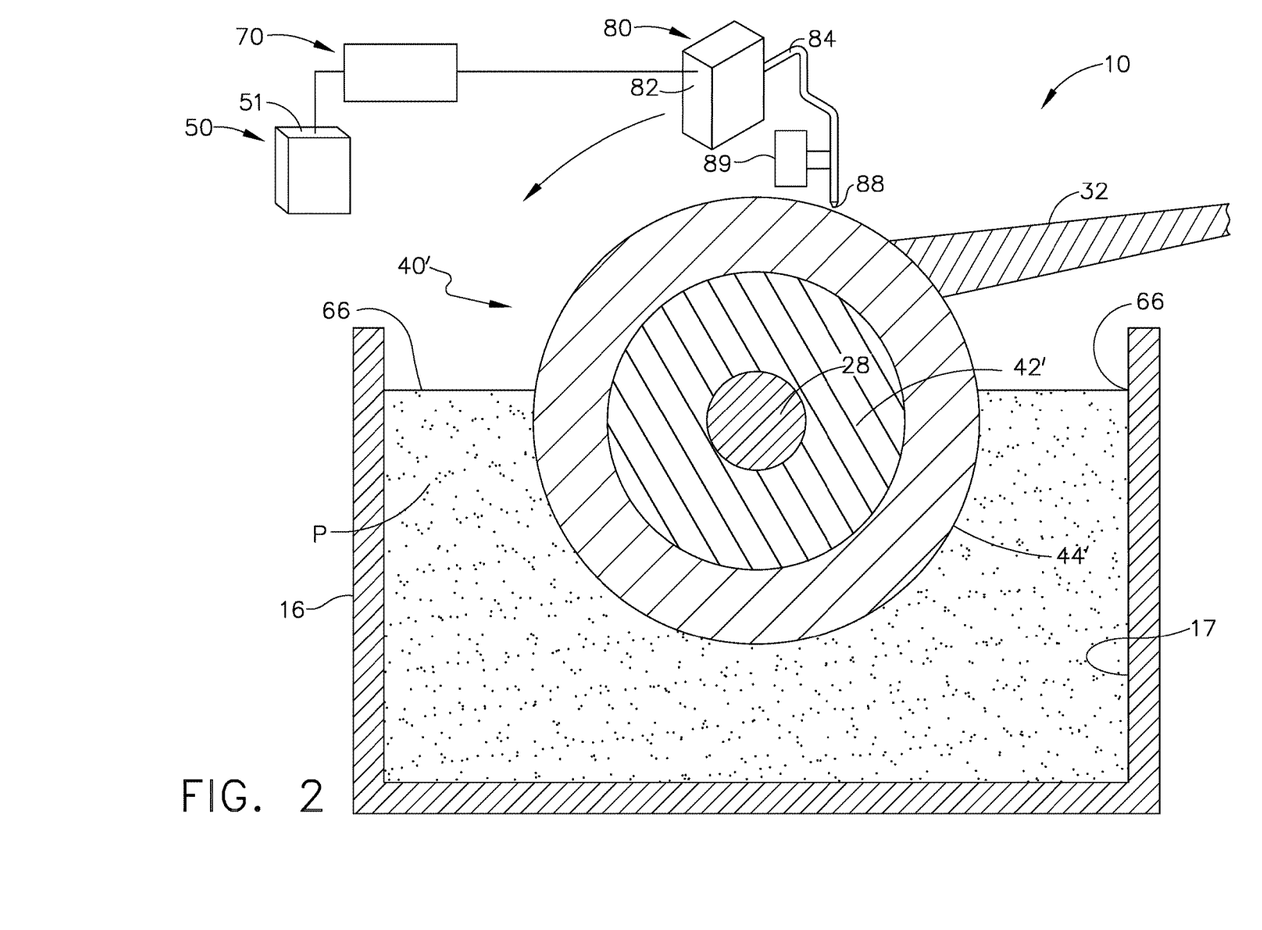
FIG. 2 shows a sectional view of an apparatus according to the present invention shown in FIG. 1 taken along line 2-2 in showing a part at one stage of manufacture.

Continuing to refer to FIG. 1, the powder-pond additive manufacturing system 50 of apparatus 10 includes a box 16 that defines a reservoir 17 for containing a powder P. It should be appreciated that the box 16 is a container, vat, or other vessel. The box 16 is fluidly connected to a source 18 for providing gas that can be used to fluidize the powder P that is contained in reservoir 17. The gas source 18 is fluidly connected to the box 16 via a conduit 22 for fluidizing gas and an inlet 24. The box 16 is also configured to receive opposite ends of the mandrel 28 at supports 26. The mandrel 28 is connected to an indexing motor 29 which is configured to be a means for rotating the mandrel 28 a predetermined amount. The indexing motor 29 is configured to rotate the mandrel 28 in an indexing, or stepwise, fashion as will be described below. The apparatus 10 also includes a scraper arm 32 as shown in FIG. 2. It should be appreciated that scraper arm 32 is configured to remove loose powder and debris from the mandrel 28 and subsequent stages of at least some of the blisk 40 that is being formed.

Continuing to refer to FIG. 1, the powder-pond system 50 includes a primary energy source 51 and a secondary energy source 61. The primary energy source 51 and the second energy source 61 are both configured to provide a beam of energy to melt the powder P as will be discussed further below. By way of example and not limitation, the powder P can be one of the following: a metallic, a ceramic, an organic powder, a polymer, and a combination thereof.

Referring now to the powder-fed laser system 80, it includes a laser source 82, such as a pulsar continuous wave (CW) $CO_2$ laser, YAG laser or the like. A laser beam delivery system 84 for safely delivering the high-powered laser beam from the source 82 to the nozzle 88 may include a series of right angle reflective mirrors interconnected by optical conduits. Optionally, a fiber-optic beam delivery system may be used. It should be appreciated that laser delivery system 84 generally includes known optical components and may differ from that shown in FIG. 1.

Nozzle 88 further includes a powder feed system 89 for delivering a powder P' to the tip of nozzle 88 for the deposition of the powder P' material to a melt pool 83 formed on a build surface by laser welding. It should be appreciated that powder P' can be a powdered metal, powdered ceramic or the like. Nozzle 48 is structured so that powder P' exits the tip of nozzle 88 in a uniform stream substantially concentrically surrounding the laser beam also exiting the tip of nozzle 88. The energy from the laser beam will cause the powdered material to melt and fuse onto the build surface as the nozzle 88 moves across the build surface. In this manner an intermediate structure such as the hub 42 can be manufactured.

The apparatus 10 is configured to produce a bladed disc or blisk 40. The blisk 40 includes a hub 42 and a rim 44. The hub 42 can be manufactured using the apparatus 10 as will be described below. In this regard, it will be built around the mandrel 28 which will be, in effect, sacrificial and will be subsequently removed by conventional machining methods. Alternatively, the hub 42 can be a part that is obtained from another process such as conventional forging or a separate additive manufacturing process and in this regard the hub 42 can be premade. According to the illustrated embodiment, the mandrel 28 is configured to be removed from the hub 42 after the blisk 40 is completed. The apparatus 10 can also be configured to receive a cylindrical shaft that is configured to operate as the mandrel 28 but will remain a pail of the blisk 40. Such a shaft can be tubular or solid.

A plurality of airfoils 46 are defined around the rim 44 of the blisk 40. For compressors, the airfoils 46 are generally referred to as blades or buckets. For turbines, the airfoils 46 are generally referred to as blades and in the case of steam turbines, the airfoils 46 are referred to as buckets. Each of the plurality of airfoils 46 includes a tip 47 that is positioned at the distal end of the airfoil 46 away from the rim 44. The blisk 40 is configured to rotate and thus each of the airfoils 46 has a first edge 48 and a second edge 49.

Radial additive manufacturing apparatus 10 further includes a computer numerical control (CNC) 70 which is configured to control the powder-pond additive manufacturing process 50 and the powder-fed additive manufacturing process 80. To this end, the control computer 70 is electrically connected either wirelessly or directly to the systems and the indexing motor 29. Together, the computer control 70 and the indexing motor 29 make up a means for repositioning the mandrel 28. The computer control 70 is also electrically connected to a system for introducing fluidizing gas through conduit 22 from fluidizing gas source 18 into the reservoir 17 through the inlet 24.

Computer numerical control (CNC) 70 is configured to track the location of the primary energy source 51 and the secondary energy source 61 of the powder-pond additive manufacturing system 50. In this regard, sensors can be provided (not shown) that are configured to determine the position of the intersection of the energy beam from either the primary energy source 51 or the secondary energy source 61 and the work surface. To determine the position using the sensors, the energy source 51 or 61 energy beam is fired at a low power level. Once the location is determined to be correct, the energy source 51 or 61 is fired at the desired power level to fuse material. Thus the position of the laser focal spot can be tracked in all three axes.

The present invention can be better understood by a description of the operation thereof. During the operation of apparatus 10, the blisk 40 is built up gradually by fusing the powder P and adjacent work surface of a workpiece. The workpiece can be the mandrel 28 or any part or intermediate to a part that defines a work surface positioned to be rotated by the apparatus 10. For example, as the intermediate structures of the blisk 40 as will be introduced below are all considered workpieces. The workpiece can also be a hub that will be used in the final part and that was previously manufactured by additive manufacturing or conventional means.

It should be noted that when intermediate structures are referred to during the build process, the reference number associated with the completed structure will be used along with the prime symbol "'". For example, intermediate structures of the blisk 40 will be referred to as the blisk 40'. Likewise, intermediate structures of the hub 42, the rim 44, and the airfoils 46 will be referred to as the hub 42', the rim 44', and the airfoils 46' respectively.

The process begins with a step of installing the mandrel 28 in the box 16. Referring now to FIG. 2, the powder-fed additive manufacturing system 80 is used to develop the hub 42' and the rim 44'. In this regard, control computer 70 issues instructions to the indexing motor 29 such that the mandrel 28 is positioned in a predetermined location radially and the indexing motor 29 is stopped. Subsequently, control computer 70 issues instructions to the powder-fed laser source 82 and the feed system 89 such that powder P' is positioned on the work surface of the rim 44' in a predetermined location and fused thereon. The powder-fed laser tip 88 is moved linearly along the face of the rim 44' to complete a buildup of fused powder P' thereon. The location of powder-fed laser tip 88 is determined by a monitoring system.

It should be appreciated that according to the illustrated embodiment, powder-fed laser tip 88 is moved along the work surface of rim 44' in one direction to create one row of fused powder P. It should be appreciated that the powder-fed laser tip 88 may scan one or more times as determined by the beam build width and the angular rotation of the workpiece, i.e., the work surface of a rim 44'. Then the step of control computer 70 initiating operation of indexing motor 29 such that the mandrel 28 turns predetermined amount is repeated. Generally the amount of radial displacement made during this step is sufficient to create an adjacent row of fused powder P' next to the previously applied row of fused powder P'. It should be appreciated that as the work surface of rim 44' is sequentially indexed around, the scraper arms 32 operates to remove or scrape debris from the work surface of the rim 44'. These processes are repeated until the dimensions of rim 44' substantially equal that of finished rim 44.

Following substantial completion of the rim 44', the manufacture of the airfoils 46 is begun. As before, the intermediate stages of the airfoils 46 will be referred to as airfoils 46'. To initiate the step of creating airfoils 46', the powder P is introduced into the reservoir 17. It should be appreciated that the powder P can be introduced into the reservoir 17 prior to the installation of the mandrel 28 or at some point after that. Thus powder P could be introduced into the reservoir 17 prior to any other steps of additive manufacture used to create the hub 42' or the rim 44'.

Powder P is added to reservoir 17 until it reaches a predetermined powder level relative to the work surface of the rim 44'. The predetermined level of the powder P defines a powder line 66. Preferably, this predetermined level includes a first layer of powder to be fused, typically where formation of the blisk 40 is to begin on the mandrel 28. The distance between the powder line 66 and a bottom of reservoir 17 is such that the finished radius of the blisk 40 can be accommodated. It should be appreciated that the distance between powder line 66 and the bottom of reservoir 17 can be less than the finished radius of the blisk 40. In these cases it is anticipated that the mandrel 28 will be repositioned relative to the bottom of reservoir 17 prior to completion of the blisk 40. The powder line 66 can be at any level relative to the mandrel 28, above or below. It should be appreciated that the powder line 66 must be positioned such that it passes by or intersects the workpiece. When the powder line 66 is positioned in this manner the powder P can be fused to the workpiece.

Figure 3:
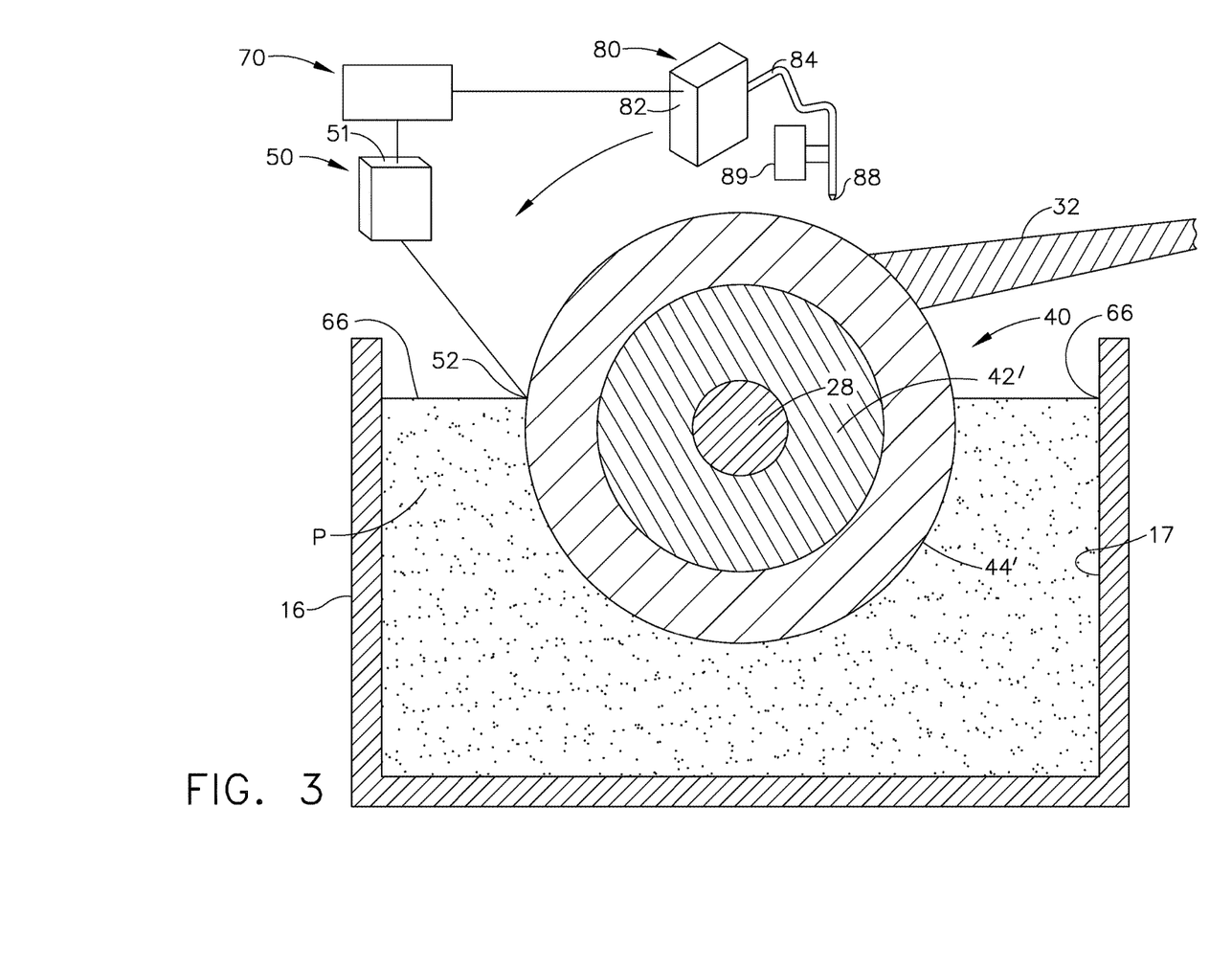
FIG. 3 shows a sectional view of the apparatus as shown in FIG. 2 wherein the part is at a further stage of manufacture.

As can be seen in FIG. 3, once the powder P is deposited to the predetermined level in reservoir 17 of the box 16, the directed energy source 51 (such as a laser or electron beam) is used to melt the powder P that contacts the work surface of the rim 44' at a desired location. In this manner, a layer of the airfoil 46' is begun. The directed energy source 51 emits a beam and a beam steering apparatus is used to steer the beam over the powder P at the intersection of the work surface at a first radial position of the rim 44' in a line generally parallel to the axis of the mandrel 28.

As used herein, the "radial position" refers to the position of a workpiece such as the mandrel 28 as it relates to rotational mandrel 28. For example, a first radial position can be at 0°. A second radial position can be at 180°. As will be discussed further below multiple layers can be deposited or fused at a single radial positioned such that an airfoil 46 can be built up by layers at a predetermined radial position. The radial position where fusing occurs is a function of the level of powder line 66 and the diameter of the workpiece. Thus the radial position where fusing occurs can be at any point between 0° and 180° for the first energy source 51 and 180° and 360° for the second energy source 61 where the respective energy sources are positioned such that there is a laser path between the respective energy source and where fusing occurs.

The exposed layer of the powder P is heated by the beam to a temperature allowing it to melt, flow, and consolidate and fuse to or adhere to a substrate defined by the mandrel 28 with which it is in contact. The metallic particles that made up the melted portion of powder P now exist as pail of the in process portion of the blisk 40. As a non-limiting example, the thickness of the fused powder layer may be about 10 micrometers (0.0004 in.). This step may be referred to as fusing the powder. Indexing mandrel 28 is the next step. In this regard, mandrel 28 is driven by indexing motor 29 such that the workpiece, the mandrel 28, is rotated to a second radial position and next substrate work area intersects with powder line 66.

It should be appreciated that during the fusing step and the indexing step the powder P contained within the reservoir 17 is likely disturbed and might be unevenly distributed relative to the workpiece. A step of fluidizing the powder P pond contained within reservoir 17 can be utilized to level the surface of powder P such that the powder level 56 is predictably positioned relative to the mandrel 28. The step of fluidizing is conducted by introducing air or other gas from the gas source 18 through the conduit 22 for fluidizing gas and inlet 24 into reservoir 17.

Figure 4:
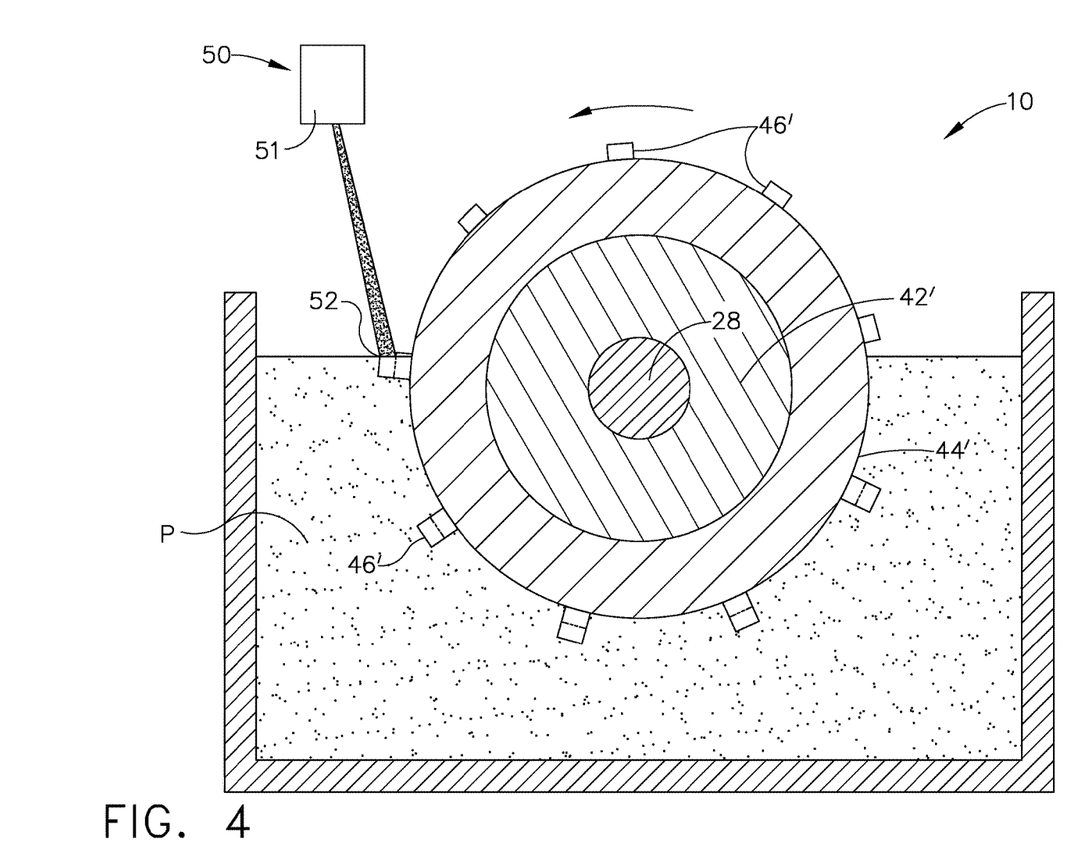
FIG. 4 shows a sectional view of the apparatus as shown in FIG. 3 wherein the part is at a further stage of manufacture.

Referring now to FIG. 4, multiple intermediate airfoils 46' can be formed. A first layer of each airfoil 46' is formed as described above. After each first layer is completed, control computer 70 activates indexing motor 29 mandrel 28 is turned such that the work surface of the rim 44' is positioned relative to powder level 56 at the predetermined location of the next airfoil 46'. The sequence of fusing powder P and indexing mandrel 28 to form the base of each airfoil 46' and then indexing mandrel 28 to the location of the next airfoil 46' is repeated until all of the airfoil 46' has been begun.

Referring now to FIG. 4, the steps of completing the multiple airfoils 46 by building additional layers of airfoil 46' can be seen. The mandrel 28 is rotated to position the intersection of the beam of primary laser 51 with the previously built layers of a predetermined airfoil 46'. As can be seen in FIG. 4, the width of the melt pool 52 and a beam generated from the primary laser 51 are approximately equal. It should be noted that this width is greatly exaggerated relative to the other components shown within FIG. 4 and FIG. 5 in order to better convey the invention.

Figure 5:
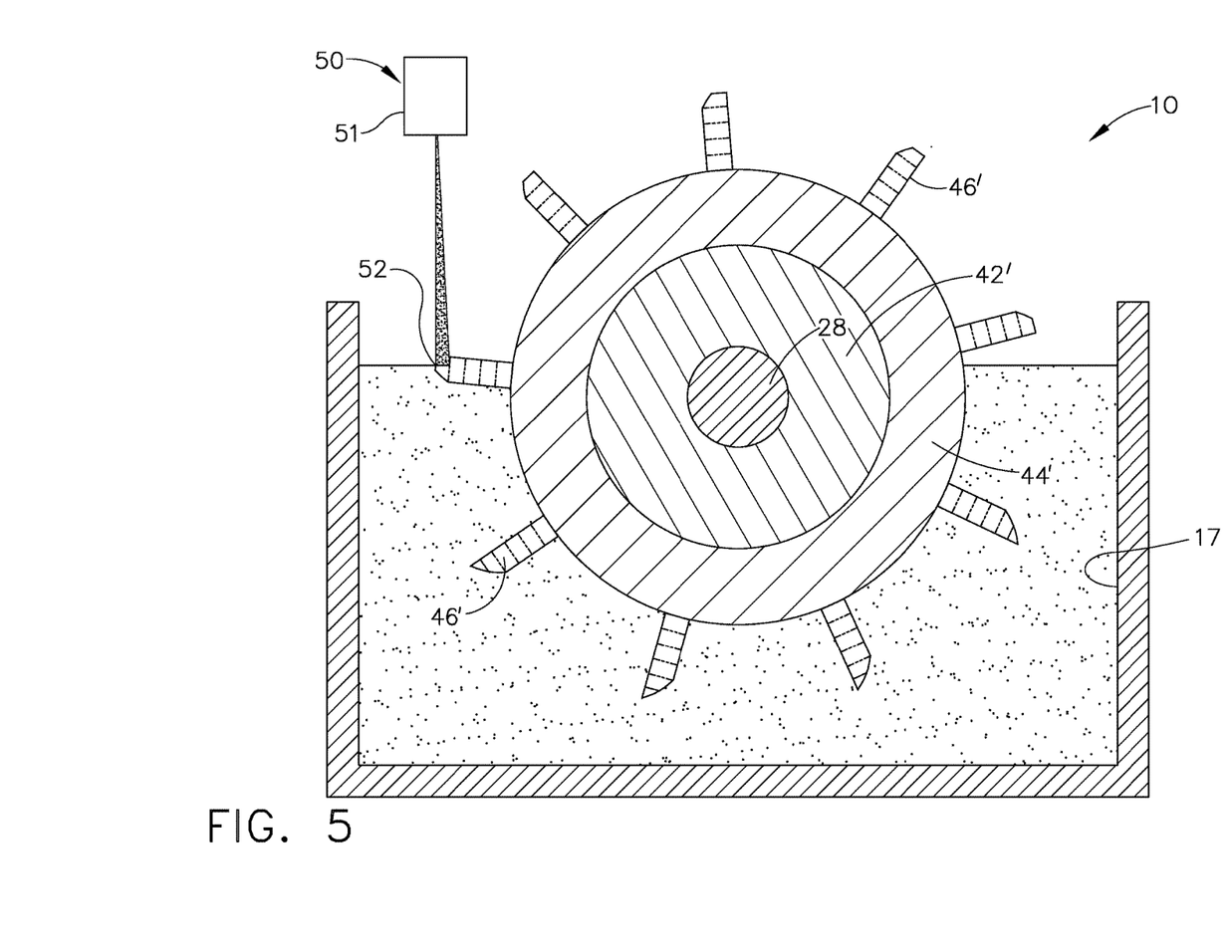
FIG. 5 shows a sectional view of the apparatus as shown in FIG. 4 wherein the part is at a further stage of manufacture.

Referring now to FIG. 5, it can be seen that the amount of powder fused during each fusing step i.e. after indexing step or rotation, can be varied to shape the axial protrusions from the rim 44' in a desired manner as shown. As shown in FIG. 5, four airfoils 46 have been completed. One airfoil 46' is in the process of having a last layer completed. Four additional airfoil 46' remain to be completed.

A further option in the method of manufacturing blink 40 described above is that computer control 70 can be programmed to operate the secondary energy source 61. Operation of the secondary energy source 61 is substantially similar to and can be understood from the above description of the operation of the primary energy source 51. The secondary energy source 61 is positioned opposite the primary energy source 51 such that the intersection of the powder line 66 on both sides of the work surface of the rim 44' can be utilized to build layers of airfoil 46'. It is believed that the operating time of the primary energy source 51 and the secondary energy source 61 is much less than the time required to reposition the mandrel 28 and to prepare the powder level for the next fusing step. Thus, the efficiency of the total system can be increased by effectively doubling the amount of fusing that can be performed for each indexing sequence by operating both the primary energy source 51 and the secondary energy source 61.

According to an alternative embodiment, the powder-fed additive manufacturing system can be operated in conjunction with the primary energy source 51 and the secondary's energy source 61 of the powder-pond manufacturing system 50. In this configuration, three fusing operations can be performed for each indexing step as shown in FIG. 1.

Figure 6:
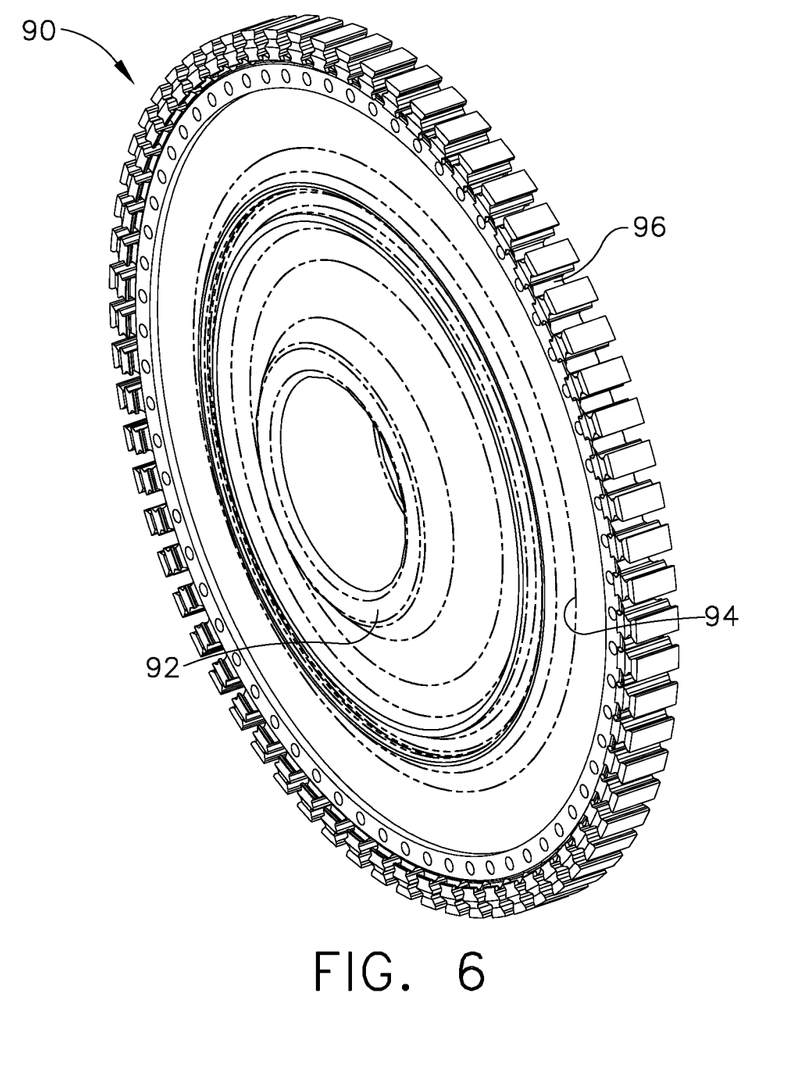
FIG. 6 shows another part that can be manufactured with the apparatus for additive manufacturing utilizing rotational build surfaces of the present invention.

As shown in the FIGS. 1-5, a bladed disc or blisk 40 can be created. It should be appreciated that other axi-symmetric shapes can also be created. For example as shown in FIG. 6, a turbine wheel disc 90 can also be formed. The turbine wheel disc 90 shown in FIG. 6 includes a hub 92, a rim 94, and dovetail features 96. Other features that can be formed with the apparatus 10 include axisymmetric sealing features such as seal teeth, honeycomb, and compression seals. Also, axisymmetric locking features such as splines, gear teeth, and the like can be formed with the apparatus 10.

Additive manufacturing describes a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

The present invention has advantages over the prior art. The radial additive manufacturing process described above is far more flexible as to shape and configuration of axisymmetric parts. In addition, it is believed that the radial additive manufacturing process provides the ability to make parts that have more complex geometries that would be not possible with conventional manufacturing methods. Such more complex parts include dual material axi-symmetric parts and integrally bladed rotors. In addition, manufacture of such parts requires fewer support structures and the parts can be larger than conventional methods of forming such parts. The apparatus and method described above allow for the flushing of powder using a combination of gravity and spindle rotation. Also, it is believed that the radial manufacturing process described above requires less space and smaller equipment for a given part as compared to conventional manufacturing methods.

The foregoing has described an apparatus and a method for forming axi-symmetric parts and all of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. An apparatus for manufacturing an axi-symmetric part, the apparatus comprising:
   a vessel configured to contain a powder, one or more walls of the vessel defining supports configured to rotatably receive a workpiece such that at least a portion of the workpiece contacts the powder contained within the vessel;
   a first energy source configured to generate a first beam of energy to melt the powder at a first radial location such that the melted powder fuses to the workpiece at the first radial location; and
   a means for rotating the workpiece around an axis between the first radial location and a second radial location such that at least a portion of the workpiece at the second radial location contacts the powder contained within the vessel and the first radial location of the workpiece is submerged in the powder.

2. The apparatus according to claim 1, wherein the first energy source is configured to generate the first beam of energy to melt the powder at the second radial location such that the melted powder fuses to the workpiece at the second radial location.

3. The apparatus according to claim 2, wherein the means for rotating the workpiece around the axis includes an indexing motor that is configured to move the workpiece radially a predetermined distance.

4. The apparatus according to claim 3, further comprising a computer control configured to activate the first energy source such that the first beam is directed to an intersection of a powder level and a surface of the workpiece at a first location.

5. The apparatus according to claim 4, further comprising a second energy source configured to generate a second beam of energy to fuse the powder at a second location within the intersection of the powder level relative to the workpiece.

6. A method for manufacturing an axi-symmetric part using a powder-fed additive manufacturing system that includes a vessel that is configured to contain a powder, one or more walls of the vessel defining supports to rotatably support a workpiece and that includes a first energy source configured to generate a first energy beam sufficient to melt the powder at a predetermined location, the method comprising the steps of:
   operating the first energy source;
   fusing the powder onto a surface of the workpiece when the workpiece is at a first radial position to form a first fused layer;
   rotating the workpiece to a second radial position such that the first radial location of the workpiece is submerged in the powder;
   fusing the powder onto a surface of the workpiece when the workpiece is at the second radial position;
   rotating the workpiece to the first radial position; and
   fusing the powder onto the first fused layer to form a second fused layer.

7. The method according to claim 6, further comprising the steps of:
   rotating the workpiece to the second radial position and fusing the powder onto the previously fused material at the second radial position.

8. The method according to claim 6, further comprising the steps of operating a second energy source to generate a second energy beam;
   fusing the powder to the workpiece at a third radial location.

9. The method according to claim 8, further comprising the steps of:
   rotating the workpiece;
   fusing the powder at a fourth radial position on the workpiece; and
   fusing the powder at a fifth radial position on the workpiece.

10. The method according to claim 6, further comprising a step of cleaning a surface of the workpiece after the fusing step.

11. The method according to claim 10, wherein the step of cleaning occurs while the workpiece is rotating.

12. The method according to claim 6, wherein the axi-symmetric part includes a non-sacrificial hub held by a mandrel.

13. The method according to claim 6, wherein the workpiece is configured as a mandrel about which an axi-symmetric part is manufactured and the mandrel is removed from the part to form a bore within the part.

14. An apparatus for manufacturing an axi-symmetric part, the apparatus comprising:
   a box defining a reservoir configured to contain a powder;
   supports defined by one or more walls of the box for supporting the part such that the part is rotatable;
   the supports being configured such that the part is in contact with the powder;
   a motor for indexing the part between multiple predetermined radial positions; and
   an energy source configured to fuse the powder to the part at each radial position while another of the radial positions is submerged in the powder.

15. The apparatus according to claim 1, further comprising:
  a gas source fluidly connected to the vessel for providing a flow of gas into the vessel.

16. The method of claim 6, further comprising a step of providing a flow of fluidizing gas into the vessel.

17. The apparatus according to claim 14, further comprising:
  a gas source fluidly connected to the reservoir for providing a flow of gas into the reservoir.

18. The apparatus according to claim 1, further comprising:
  a powder-fed laser tip for depositing and fusing additive powder onto the workpiece at a location above a powder level within the vessel, the additive powder being deposited in a uniform stream concentrically around the powder-fed laser tip.

19. The method of claim 6, further comprising a step of:
  depositing and fusing additive powder onto the workpiece at a location above a powder level within the vessel using a powder-fed laser tip, the additive powder being deposited in a uniform stream concentrically around the powder-fed laser tip.

20. The apparatus according to claim 14, further comprising:
  a powder-fed laser tip for depositing and fusing additive powder onto the part at a location above a powder level within the reservoir, the additive powder being deposited in a uniform stream concentrically around the powder-fed laser tip.

\* \* \* \* \*